Sept. 21, 1926.  1,600,777
C. PFAU
MAKING WATER CLOSET SEATS AND LIDS
Filed June 9, 1924   3 Sheets-Sheet 1

INVENTOR
Charles Pfau
BY James N. Ramsey
ATTORNEY

Sept. 21, 1926. 1,600,777
C. PFAU
MAKING WATER CLOSET SEATS AND LIDS
Filed June 9, 1924 3 Sheets-Sheet 2
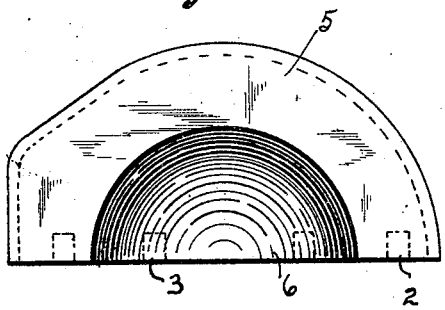
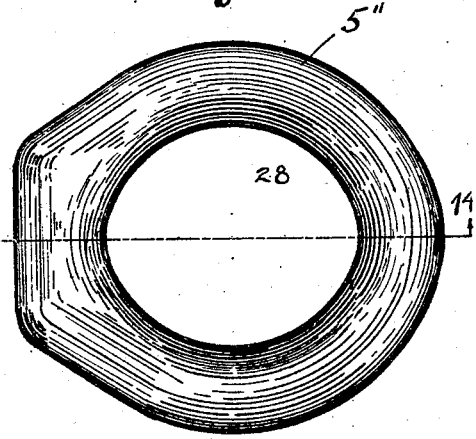
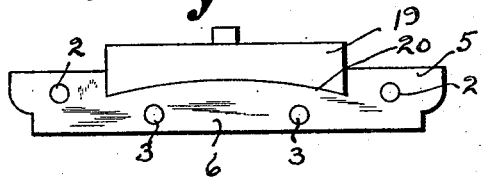
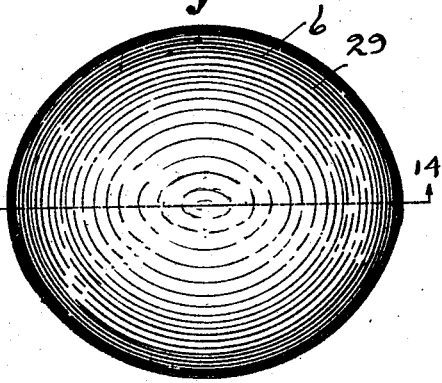
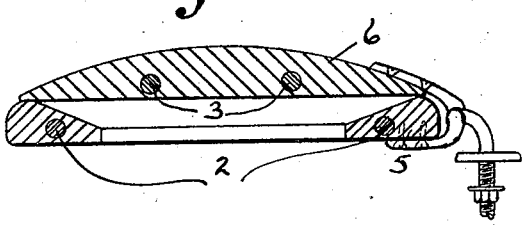
INVENTOR
Charles Pfau
BY James N. Ramsey
ATTORNEY Sept. 21, 1926. 1,600,777
C. PFAU
MAKING WATER CLOSET SEATS AND LIDS
Filed June 9, 1924 3 Sheets-Sheet 3

INVENTOR
Charles Pfau
BY James N. Ramsey
ATTORNEY

Patented Sept. 21, 1926.

1,600,777

UNITED STATES PATENT OFFICE.

CHARLES PFAU, OF CINCINNATI, OHIO.

MAKING WATER-CLOSET SEATS AND LIDS.

Application filed June 9, 1924. Serial No. 718,842.

My invention relates to the art of making water closet seats and lids particularly adapted for use on water closets and it relates to the seat and lid as an article of manufacture.

The objects of my invention are to provide a new process adapted to reduce the cost of manufacturing water closet seats and lids by lessening waste of material and effecting a saving of time in manufacturing as well as to simplify and improve their construction; and to provide a new process whereby a water closet seat and lid are simultaneously made from the same piece or pieces of material.

My invention consists in forming a water closet seat out of a given quantity of material, such as a board or a plurality of boards suitably doweled or otherwise secured together and then forming the lid out of that portion of the material which is cut to form the hole or opening in the seat.

My invention also consists in the means employed, and in the several steps whereby the completed seat and lid are formed, as herein set forth and claimed.

Heretofore in the manufacture of water closet seats and lids it has been the practice to form a board of requisite area and thickness and cut a hole therein to form the seat, or to secure several pieces together in rectangular or other form leaving a hole therein, which when enlarged and rounded out forms the hole in the seat. The cut-out portions were discarded as waste material and the lid was formed by cutting another piece of material, of suitable area and thickness, to the required size and shape for that purpose.

Inasmuch as lumber is constantly becoming more scarce and consequently more expensive the utilization of substantially the entire quantity of material for both the lid and seat, by simultaneously forming the lid by the operation of cutting a hole in the material to form the seat, manufacturers are enabled to make a high grade water closet seat and lid, by the use of my process, at considerably less than the usual cost.

In the drawings:

Fig. 9 is a plan view showing one-half of the formed and shaped board and relative position of the dowel holes therein, and with the lid partly formed;

Fig. 10 is a plan view of a completed water closet seat, formed from two seat portions after the seat portions are separated from the lid portions;

Fig. 11 is an inside edge view of Fig. 9 and showing the boring tool in position for partly forming the top of the lid by cutting away excess material and partly forming the hole in the seat;

Fig. 12 is an inside edge view showing the same as in Fig. 9 and with the lid portion separated from the seat portion and showing the relative position of a saw or other tool for performing the operation;

Fig. 13 is a plan view of a completed water closet lid;

Fig. 14 is a longitudinal section taken on a line corresponding to 14—14 in Figs. 10 and 13 and showing the lid in closed position upon the seat;

Figure 1:
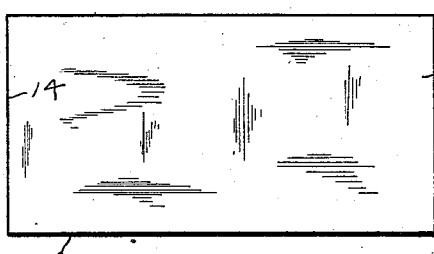
Fig. 1 is a plan view of a dimensional board.
Figure 2:
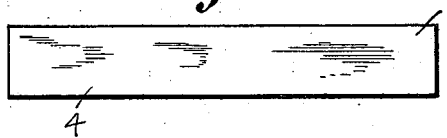
Fig. 2 is an edge elevation of the same.
Figure 6:
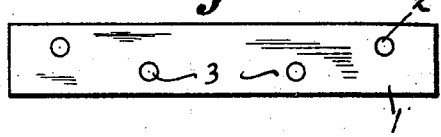
Fig. 6 is an inner edge elevation of the same.
Figure 3:
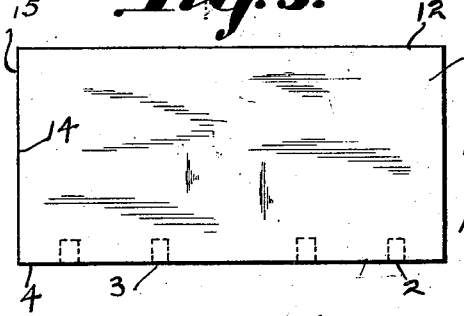
Fig. 3 is a plan view of a dimensional board showing the relative position of dowel holes therein.
Figure 7:
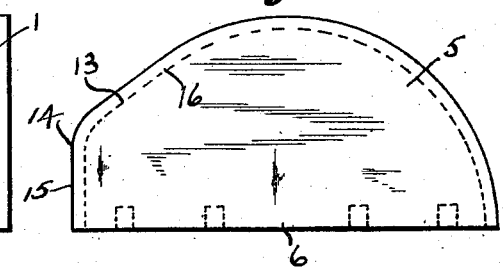
Fig. 7 is a plan view of the partly formed board showing the relative position of the dowel holes therein, with the outside edge partly shaped.
Figure 4:
Fig. 4 is an edge elevation of the same.

In performing the operations of my new process of manufacturing water closet seats and lids in the preferred manner, I provide board 1, as shown in Figs. 1 and 2, cut to the required dimension. The board may comprise one or more pieces of material suitably connected together and consists of sufficient material from which to form one-half of a seat and lid, respectively. After cutting board 1 to the required dimension, I drill dowel holes 2 and 3 in longitudinal inner edge 4 of the board and at right angles to the edge, as shown in Figs. 3 and 4. The dowel holes 2 and 3 are positioned advantageously relative to ultimately connecting seat portion 5 and lid portion 6, respectively, with like cooperating lid portion and seat portion, respectively, as hereinafter explained.

Figure 5:
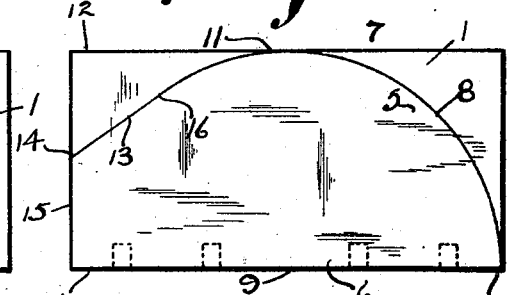
Fig. 5 is a plan view of a dimensional board showing the relative position of dowel holes therein and showing the board partly formed.
Figure 8:
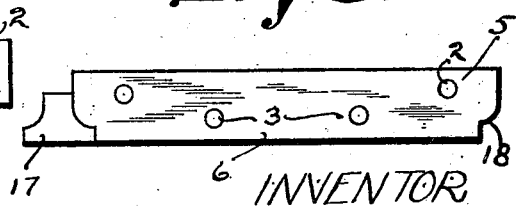
Fig. 8 is an inside edge view of the same and showing the tool for shaping the outside edge.

By the use of a band saw, or other suitable means, I form the outer edge 7 of board 1, as shown in Fig. 5 in which edge portion 8 is curved from a radius having a center 9 centrally disposed longitudinally of the board and approximately positioned adjacent edge 4 thereof. The edge 8 extends from inner corner 10 of the board and then to the longitudinal center 11 of the board adjacent edge 12 and then extends further to a point which is determined by drawing line 13 from centrally disposed point 14 of transverse edge 15 tangent to the curved surface approximately at point 16. By the use of shaper 17, or other suitable tool, I then shape the outer edge 18 of seat portion 5 and lid portion 6, as shown in Fig. 8, after which boring tool 19 is then employed for the purpose of cutting convex surface 20 in lid portion 6, as shown in Fig. 11. The seat portion 5 and lid portion 6 are then ready for separation by means of saw 22 or other suitable means, being projected at an angle approximately extending from the center 21 between edges 23 and 24 of the seat to a point 25 comprising the intersection of angular surface 26 and curved surface 27 previously formed by shaper 17.

The usual finishing or sanding process is then proceeded with or the sanding process may be completed after seat portion 5 and lid portion 6, respectively, are assembled as shown in Figs. 10 and 13, by means of dowel pins being inserted in holes 2 and 3, respectively, of each half portion of the seat and lid it being understood that seat and lid portions 5 and 6, respectively, are made in right and left halves and that the lid is attached to the same side of the seat from which it is removed whereby the saddle of the seat relative to the lid is capable of being properly positioned for use.

While I have shown and described a process for manufacturing water closet seats and lids in which half portions respectively of the seat and lid are completed at a time, it is apparent that two half cooperating portions of each seat and lid may be completed simultaneously by means of suitable equipment and tools adapted to be inserted between longitudinal edges 4 of two boards 1, whereby the operation heretofore explained as relating to a half seat and lid portion, respectively, may be performed on two half seat and lid portions. Numerous means and plans may be devised for carrying my invention into effect and which consists primarily in forming a water closet seat and lid from the same boards and with minimum losses of material, thereby considerably reducing the cost of material required in manufacturing the same, as well as reducing the labor cost.

The method of manufacturing my water closet seat and lid as heretofore explained in detail provides a circular hole in the seat. It is apparent that various operations may be resorted to for the purpose of providing an oblong hole 28 in the seat 5″, as shown in Fig. 10, and for forming a oblong lid 29, as shown in Fig. 13, and which operation may comprise the removal of a strip from longitudinal edge 4 of board 1.

Figure 15:
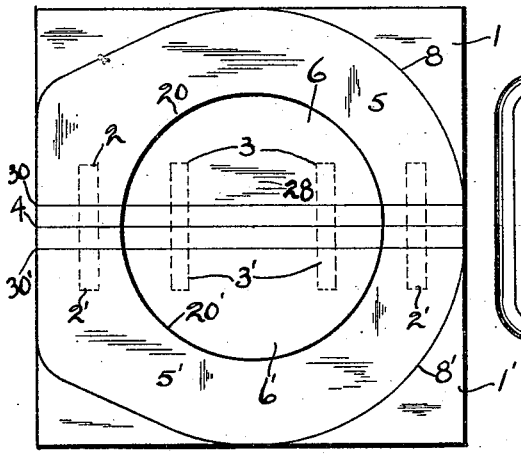
Fig. 15 is a plan view showing a modified method of making a water closet seat and lid.
Figure 16:
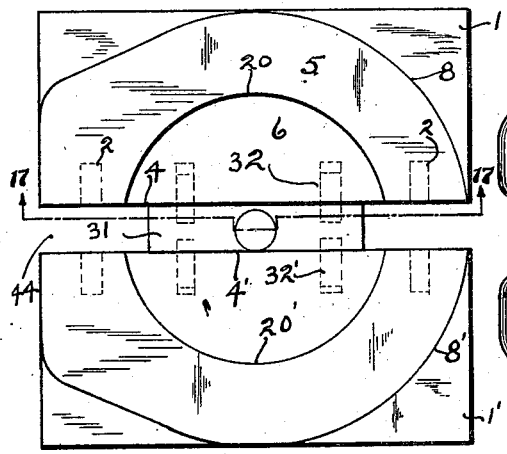
Fig. 16 is a plan view showing another modified method of making a water closet seat and lid.
Figure 17:
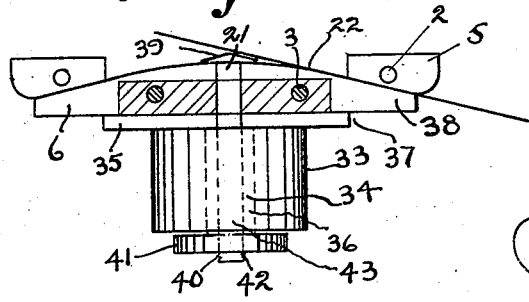
Fig. 17 is a section taken on a line corresponding to 17—17 in Fig. 16.

In Figs. 15 and 16 I show a modified method of constructing a water closet seat and lid. In Fig. 15 I provide boards 1 and 1′, respectively, having longitudinal edges 4 and 4′ secured together by dowel pins (or other suitable means) combinedly received in dowel holes 2 and 3, and 2′ and 3′, respectively, of each board whereby practical effects of the use of a single board is attained. Half seat portions 5 and 5′, respectively, of boards 1 and 1′ preferably have outer edges 8 and 8′, respectively, formed in a single operation. The outer edges of the half seat portions 5 and 5′, respectively, may then be formed by suitable shaper 17, as shown in Fig. 8, and convex surfaces 20 and 20′, respectively, of the boards may then be formed in a single operation by suitable boring tool 19, as shown in Fig. 11, after which longitudinal strips 30 and 30′, respectively, may be cut and removed from longitudinal edges 4 and 4′, respectively, of boards 1 and 1′, for the purpose of providing oblong hole 28 in seat 5″ and oblong lid 29, respectively, as shown in Figs. 10 and 13. Seat portions 5 and 5′, respectively, may then be separated from lid portions 6 and 6′ (Fig. 15) by saw 22, as shown in Figs. 12 and 17. The saw may be introduced between the boards after strips 30 and 30′ have been removed therefrom.

In Fig. 16 I show another modified method of constructing a water closet seat and lid in which boards 1 and 1′ have longitudinal edges 4 and 4′, respectively, secured to strip 31 by dowel pins 32 and 32′ of the strip, respectively, received in dowel holes 2 and 2′ of the boards. Edges 8 and 8′, respectively, of boards 1 and 1′ may be formed in one operation and then shaped, as shown in Fig. 8 in another single operation and then convex surfaces 20 and 20' may be formed, as shown in Fig. 11 in another single operation, and then seat portions 5 and 5', respectively, may be separated from lid portions 6 and 6', respectively, by another single operation by saw 22, as shown in Figs. 12 and 17.

In Fig. 17, I show a preferred means of separating seat portions 5 and 5', respectively, from lid portions 6 and 6', respectively, in which support 33 may be secured to a suitable table top (not shown) and has hollow shank 34 of T-shaped member 35 secured in hole 36 of the support. Member 35 has flange 37 adapted to engage the lower side 38 of lid portions 6 and 6' whereby the seat portions and lid portions are adapted to be maintained in rotatable position by top 39 integral with shank 40, adapted to be tightened in contact with the lid portions by manual operation of hand wheel 41 threaded to outer end 42 of shank 40. Shank 40 is rotatably mounted in hole 43 in shank 34 of member 35 whereby saw 22 may be inserted in opening 44 between the seat portions, and lid portions 6 and 6' may be separated therefrom by saw 22 in one operation by rotation of the seat and lid portions when positioned, as shown in Fig. 17. Seat portions 5 and 5', respectively, and lid portions 6 and 6', respectively, may then be assembled whereby oblong hole 28 is formed in seat 5'', as shown in Fig. 10 and oblong lid 29 is formed, as shown in Fig. 13.

Figure 18:
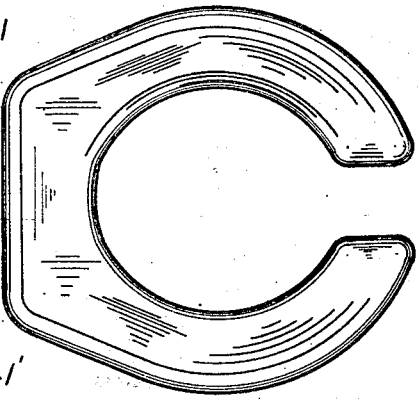
Fig. 18 is a plan view of my finished open front water closet seat.
Figure 19:
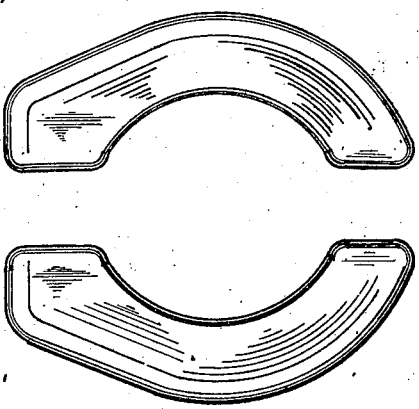
Fig. 19 is a plan view of my finished open front and rear water closet seat.

In Figs. 18 and 19, respectively, I show an open front and open front and rear toilet seat which may be manufactured by my method.

It is seen that by cutting the seat out of the central part of a board or boards, as the case may be, at an angle whereby the outer portion of the lid and inner portion of the seat, respectively, are tapered (as shown in Fig. 12) I am enabled to produce both a seat and lid of high grade out of raw material of a given dimension instead of forming the seat out of one dimension of stock and the lid out of an entirely different dimension of stock or raw material, thus minimizing and reducing to the lowest possible degree the quantity of waste material which at the present high cost of lumber and the rapidly diminishing quantity of lumber obtainable for this purpose, becomes an exceedingly important factor which must be considered in the successful and economical manufacture of water closet seats and lids.

Furthermore, by shaping the top surface of the material with a central convex surface (as shown in Fig. 11) and then continuing said surface by separating the seat and lid on the line shown in Fig. 12 thereby showing the end grain, the end grain of the wood is substantially uniformly exposed to view thereby producing a higher and more valuable grained surface than would be obtained when the wood is cut with the grain parallel with the surface.

By using lumber of the plain oak which is the cheapest grade cut oak by this process I do not show the common plain figure but on account of the angular cut, the ends of the grains which are in layers are exposed to view in substantially uniform fashion, thereby producing an attractive and beautiful surface.

It will thus be seen that I am enabled to produce the highest grade of seat and lid at the lowest cost or at the cost of the lowest grade of seat and lid as heretofore manufactured out of the same grade of lumber.

In other words I am enabled to bring out the most beautiful and attractive figures of the lumber by the tapering cut and at the same time obtain a most comfortable seat for the occupant without great waste of material and at a cost of production which enables me to produce all high grade seats and lids at a minimum of expense; that is, I am enabled to produce the highest grade of seats and lids at even less expense than the present lowest grade of seats are produced. Or stating it another way I am enabled to produce from plain sawed oak a finished seat and lid having substantially the appearance of quartered oak and this applies to any wood having figures in it.

By cutting the wood at an angle transversely of the grain longitudinally makes a uniform showing of the grain and produces a higher grade of finished product than plain wood.

By separating the seat and lid, as shown in Fig. 12, I am enabled to form the top of the seat in the most comfortable form for the occupant.

An advantage of my invention is that a highly desirable and well designed water closet seat and lid may be manufactured by my method and at a considerably lower cost for material and labor, than has heretofore been expended in making a water closet seat and lid having ordinary appearance and design.

It is apparent that important steps in my novel process in the method of making water closet seats and lids are simultaneously making the lid which is cut from the lumber to form the hole in the seat.

While I have chosen to illustrate a particular means by which the purposes of my invention may be effected, I desire to emphasize the fact that the mechanism as herein shown and described is merely for the purpose of explaining my novel method of making water closet seats and lids and that various other means are adapted to accomplish the same results.

The steps herein explained may be entirely performed by manual operative means without the use of machinery or the sequence of the steps may be varied within the scope of the invention as defined by the claims. The sequence of the steps, as herein explained and described, is only for the purpose of illustrating the preferred method by which my invention may be carried into effect.

While I have described the details of the preferred embodiment of my invention, it will be understood that it is capable of considerable modification without departing from the scope or spirit thereof, as defined in the claims, as for instance, instead of boring the stock to form the inner edge of the seat and the upper central surface of the lid at the same time, the seat and lid may be formed by eliminating that operation and after the lid has been separated from the seat by a saw or other instrument the inner edge of the seat may be removed to form a hole of the required dimension; and while I have shown and described the seat and lid each made of cooperating halves and suitably secured together, my invention also includes the making of the entire seat and lid out of a single board by cutting the lid out of the central portion of the seat and utilizing the cut-out portion, preferably reversed to form the lid, the seat and lid being suitably hinged and adapted to cooperate with each other, as shown in Fig. 14.

What I claim as new and desire to secure by Letters Patent is:

1. The process of making the woodwork for a hinged water closet seat and lid consisting in first forming a board, to the required dimension, from which it is desired to secure one-half portion of said seat and lid, respectively, then forming the outer edge of said board representing the outer shape of a half water closet seat, then shaping said outer edge, then cutting a recess in said board thereby forming a semi-circular convex side therein, then separating said lid portion from said seat portion, and then finishing the surface, then forming in the same manner a cooperating half seat and lid.

2. The process of making the woodwork for a hinged water closet seat and lid consisting in first forming a board to the required dimension, and adapted to yield one-half portion of said seat and lid, then forming the outer edge of said board representing the outer shape of a half water closet seat, then shaping said outer edge, then cutting a recess in said board thereby forming a convex surface semi-circular in form, then separating said lid portion from said seat portion whereby a one-half lid and one-half seat is formed, then in forming in the same manner another one-half seat and one-half lid and securing the last said half seat and half lid, respectively, to first said half seat and half lid.

3. The process of making the woodwork for a hinged water closet seat and lid comprising first forming a board to a dimension for obtaining therefrom one-half portion of said seat and lid, then boring dowel holes in the inner longitudinal edge thereof for the purpose of receiving one-half dowel pin, the other half of said pins adapted to receive another half portion of said seat and lid, respectively, for securing them together, then forming the outer edge of said board representing the shape of one-half of a water closet seat, then in shaping the outer edge of said board whereby a rounded edge is obtained, then cutting a recess in said board whereby a convex surface semi-circular in form is provided in said lid portion, then separating said seat portion from said lid portion, then assembling said seat portion and lid portion, respectively, with another seat portion and lid portion formed in the same manner, whereby a completed water closet seat and lid is formed.

4. A process for producing an opening and a complete cover therefor from a single thickness of material of no greater area than that necessary for enclosing the opening comprising the cutting out of the thickness or piece for the cover by a cut circumscribing the piece following the outline of a cone so as to produce a beveled edge of both the opening and of the thickness or piece removed, the thickness of the part enclosing the opening being reduced from the surface at which the opening is the wider so that the wider edge of the piece cut out will lap the opening from which it is removed.

5. The process of making the woodwork for a hinged water closet seat and lid consisting in first forming two boards to the required dimension, each of said boards adapted to yield one-half portion of said seat and lid, respectively, then joining said boards longitudinal edge to longitudinal edge, then shaping the outer edge of said joined boards to the form of the outer shape of a water closet seat, then cutting a recess in said boards whereby a convex surface approximately semi-circular in form is provided in each of said boards whereby said lid is partly formed, then separating said lid from said seat, then securing said one-half seat portions together and said one-half lid portions together whereby a water closet seat and lid is formed from two said boards.

CHARLES PFAU.